Jan. 27, 1925.  
W. BEILKE  
FRICTION CLUTCH  
Filed June 9, 1923  
1,524,231
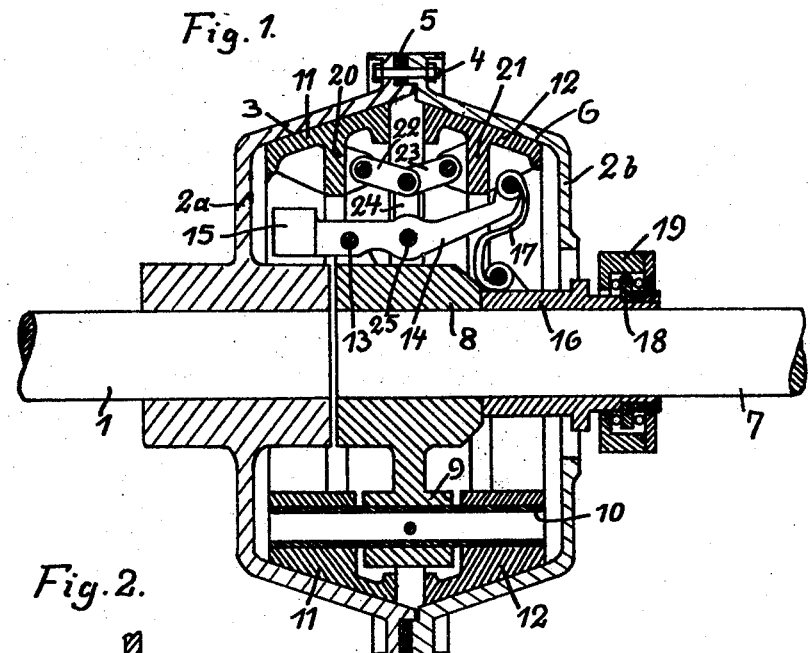
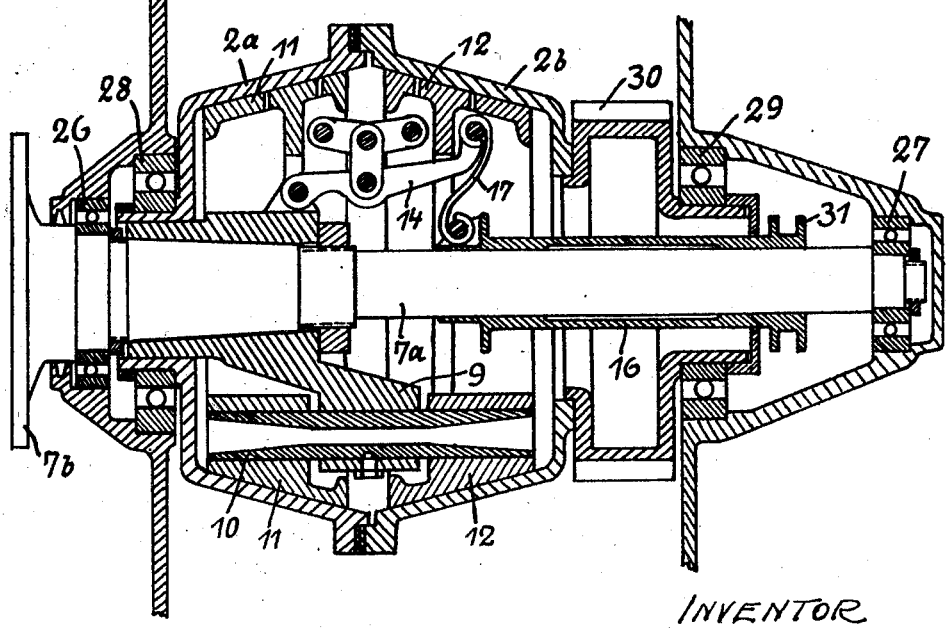
INVENTOR  
WILHELM BEILKE  
BY N. E. Gee  
Atty.

Patented Jan. 27, 1925.

1,524,231

UNITED STATES PATENT OFFICE.

WILHELM BEILKE, OF BERLIN, GERMANY, ASSIGNOR TO SIEGFRIED ROSENZWEIG, OF NEW YORK, N. Y.

FRICTION CLUTCH.

Application filed June 9, 1923. Serial No. 644,463.

*To all whom it may concern:*

Be it known that I, WILHELM BEILKE, citizen of Germany, and resident of Berlin, Germany, Wilmersdorf, Coblenzerstr. 2, have invented certain new and useful Improvements in Friction Clutches (for which I have applied for the following patents, Germany 20. 8. 1919 and 2. 3. 1921, both not yet granted); and I do hereby declare that the following is a full, clear, and exact specification, reference being had therein to the accompanying drawing.

The invention relates to friction clutch cut off couplings and more especially to devices and arrangements of parts which are adapted to enable the clutch to transmit strong turning moments without being very voluminous and heavy, and further the engaging and disengaging action is secured even at extraordinary high numbers of revolutions, at which most of the clutches as now used lose their sureness of action.

The invention is shown in the drawing, in which—

Fig. 1 is a longitudinal section of a clutch adapted for common use, and

Fig. 2 is a longitudinal section of a clutch connected to a toothed gearwheel.

Referring to Fig. 1, the driving shaft 1 carries therewith a casing $2^a$, which is provided with a conical friction surface 3. This casing part $2^a$ is connected to a casing part $2^b$ by aid of bolts 4 and intermediate metal sheets or shims 5 serving for adjustment. The said casing part $2^b$ contains a second conical friction surface 6. The second shaft 7 is provided with a hub 8 having arms 9 and bolts 10 secured in said arms, which bolts slidably support two friction cones 11, 12 situated inside the above said conical surfaces 3, 6, so as to couple said cones with the shaft 7 for common rotation. Such bolt connections are provided at three points at 120° distance from each other, and between these connections three engaging and disengaging gears are arranged each as follows.

At the hub 8 a pivot bolt 13 supports a lever 14, which is counterweighted by a weight 15, and is connected to an axially slidable control sleeve 16 by a spring or elastic link 17 being an S-shaped steel leaf. The bent end part of the lever 14 enables the link 17 to be sufficiently long. The sleeve 16 is connected by a double thrust ball bearing 18 to an outer sleeve 19 which may be engaged by a forked hand lever of known type. The elastic link 17 is so arranged that at the innermost axial position of the sleeve 16 the link 17 has somewhat passed its radial position and holds the sleeve in its innermost position, which is the position of engagement.

The friction cones 11, 12 are so thin that in their inner space there is enough room to allow the actuating lever 14 to extend over the whole length of the clutch and thereby be extraordinarily efficient. The cones 11, 12 are stiffened by annular ribs 20 and 21 respectively, so as to have T-shaped cross sections, and between the said ribs a pair of knee or toggle levers 22 and 23 is attached to said cones so as to allow of pressing them against the friction surfaces 3, 6 as soon as the common link of said levers 22, 23 is pushed outward, which is effected by aid of a rod 24 connecting said common link to a bolt 25 held in the coupling lever 14 near the pivot bolt 13 of the latter.

The operation of the clutch is as follows. By pushing the sleeve 16 axially inward to the position shown in the drawing the elastic link 17 moves the lever 14 outward and this lever entrains the rod 24 with a force augmented or increased by the unequal arms of said lever 14, and the rod 24 by the knee levers 22, 23 presses the cones 11, 12 into engagement at the friction surfaces 3, 6 with a force further increased as the knee levers are near to their outward position. Thus with relatively small force of the elastic link 17 an extraordinary great pressure is produced on the cones 11, 12, which ensures correct engagement under all circumstances. Disengagement is effected by withdrawing the sleeve 16 which causes the reverse movement of parts above described.

For restoring after long use, or adjusting the right distance of the friction surfaces 3, 6 between each other and thereby adjusting the extended position of the knee levers 22, 23 it is only necessary to loosen the bolts 4 and take out (or add) some of the adjusting metal sheets 5, which may be rings or ring sectors encircling the whole clutch casing, or only small rings encircling the bolts 4.

Referring now to Fig. 2 the main parts of the clutch correspond to those of Fig. 1 and are designated by corresponding reference numbers.

This clutch is intended for use with high speed engines and reducing gears, as used for instance in submarines and large flying machines, and therefore it has special arrangements for avoiding undue friction in the bearings and dangerous vibration.

The shaft 7ª extends through the whole clutch and is provided with a flange 7ᵇ for fastening a propeller or a shaft, for instance a motor crank shaft. Said shaft 7ª is held in two ball bearings 26, 27 mounted in a main frame or casing of adapted design. The clutch casing 2ª, 2ᵇ is also held in said main frame by ball bearings 28, 29. A toothed wheel 30 (or a pulley) is fixed to the casing part 2ᵇ between the latter and the ball bearing 29, and a motor pinion (not shown) or a wheel to be driven may be in engagement with said wheel 30. The control sleeve 16 is provided with a ring 31 of U-shaped cross section, which may be engaged by a hand lever as usual.

The operation corresponds to that of the first described clutch. The shaft 7ª due to its extraordinary safe arrangement of bearings is adapted to run at high speed without danger of vibration, and no excentricity will arise between the clutch casing 2ª, 2ᵇ and the cones 11, 12, due to the great distances between the concentrically arranged bearings 26, 28 and 27, 29 respectively. Also, as the clutch casing is completely shut up, no dust or other parts, as for instance particles ground or broken from the teeth of the toothed gear are allowed to pass inside and disturb the operation of the clutch.

What I claim is:

1. A friction clutch comprising in combination a casing, a central shaft, a driving wheel connected to said casing, bearings at the outer ends of said casing and wheel, opposite friction surfaces in said casing, opposite friction parts fitting to said friction surfaces and secured on said shaft against rotation, a control sleeve slidable on said shaft and extending through said wheel and said bearing next said wheel, and means connecting said sleeve to said friction parts so as to press the latter against said friction surfaces by axial displacement of said sleeve.

2. A friction clutch comprising in combination a casing, a central shaft, a driving wheel connected to said casing, bearings at the outer ends of said casing and wheel, opposite friction surfaces in said casing, opposite friction parts fitting to said friction surfaces and secured on said shaft against rotation, and means for pressing said friction parts against said friction surfaces, the said central shaft being held in bearings separate from the said casing and wheel.

3. A friction clutch comprising in combination a main frame, a casing, a central shaft, a driving wheel connected to said casing, bearings at the outer ends of said casing and wheel for mounting the same in said main frame, bearings at the outer ends of said central shaft for also mounting the same in said main frame, opposite friction surfaces in said casing, opposite friction parts fitting to said friction surfaces and secured to said central shaft against rotation, and means to effect the engagement of said friction parts with said friction surfaces to revolve said central shaft.

4. A friction clutch comprising in combination a main frame, a casing, a central shaft, a driving wheel connected to said casing, bearings at the outer ends of said casing and wheel for mounting the same in said main frame, bearings at the outer ends of said central shaft for also mounting the same in said main frame, opposite friction surfaces in said casing, opposite friction parts fitting to said friction surfaces and secured to said central shaft against rotation, means to effect the engagement of said friction parts with said friction surfaces to revolve said central shaft, and a driving member secured to one end of said central shaft.

In witness whereof I affix my signature.

WILHELM BEILKE.